(12) United States Patent
Pan et al.

(10) Patent No.: US 11,999,661 B2
(45) Date of Patent: Jun. 4, 2024

(54) INTERFACE JOINT MATERIAL BASED ON INDUSTRIAL SOLID WASTE AND ITS PREPARATION

(71) Applicant: NingboTech University, Ningbo (CN)

(72) Inventors: Chonggen Pan, Ningbo (CN); Yu Hu, Ningbo (CN); Jiawei Zang, Ningbo (CN); Shiyang Qu, Ningbo (CN); Zhigao Wei, Ningbo (CN)

(73) Assignee: NingboTech University, Ningbo (CN)

( * ) Notice: Subject to any disclaimer, the term of this patent is extended or adjusted under 35 U.S.C. 154(b) by 0 days.

(21) Appl. No.: 18/315,396

(22) Filed: May 10, 2023

(65) Prior Publication Data

US 2023/0382789 A1    Nov. 30, 2023

(30) Foreign Application Priority Data

May 26, 2022 (CN) .......................... 202210582667.1

(51) Int. Cl.
| | |
|---|---|
| *C04B 7/02* | (2006.01) |
| *C04B 14/10* | (2006.01) |
| *C04B 18/08* | (2006.01) |
| *C04B 24/16* | (2006.01) |
| *C04B 24/26* | (2006.01) |
| *C04B 28/04* | (2006.01) |
| *C04B 28/08* | (2006.01) |
| *C04B 103/30* | (2006.01) |

(52) U.S. Cl.
CPC .............. *C04B 7/02* (2013.01); *C04B 14/106* (2013.01); *C04B 18/08* (2013.01); *C04B 24/16* (2013.01); *C04B 24/2664* (2013.01); *C04B 28/04* (2013.01); *C04B 28/08* (2013.01); *C04B 2103/302* (2013.01)

(58) Field of Classification Search
CPC ......... C04B 7/02; C04B 14/106; C04B 18/08; C04B 24/16; C04B 24/2664; C04B 28/04; C04B 28/08; C04B 2103/302
See application file for complete search history.

(56) References Cited

FOREIGN PATENT DOCUMENTS

| CN | 105819771 A | 8/2016 |
|---|---|---|
| CN | 107200806 A | 9/2017 |

OTHER PUBLICATIONS

CNIPA, Notification of a First Office Action for CN202210582667.1, dated Aug. 29, 2022.
Ningbo Tech University (Applicant), Reply to Notification of a First Office Action for CN202210582667.1, w/ (allowed) replacement claims, dated Sep. 13, 2022.
CNIPA, Notification to grant patent right for invention in CN202210582667.1, dated Dec. 5, 2022.

*Primary Examiner* — Anthony J Green
(74) *Attorney, Agent, or Firm* — Zhigang Ma

(57) ABSTRACT

An interface joint material based on industrial solid waste includes raw materials in parts by weight: portland slag cement, 80~130 parts; metakaolin, 80~130 parts; the industrial solid waste, 80~130 parts; sodium silicate, 25~35 parts; alkali, 8~12 parts; acrylate, 30~36 parts; a trivinyl ether compound, 1~3 parts; inorganic sulfite, 1~3 parts; persulfate, 1~3 parts; a water reducing agent, 3~6 parts, and water, 60~80 parts. The interface joint material is suitable for a concrete interface of different components, with good bonding, high strength, and the advantages of pumping, fast hard, early strength, micro expansion and high ductility; In addition, the industrial solid waste is added into the interface joint material, which improves a utilization rate of the industrial solid waste in construction joint materials, and has significant for recycling of the industrial solid waste.

4 Claims, 1 Drawing Sheet

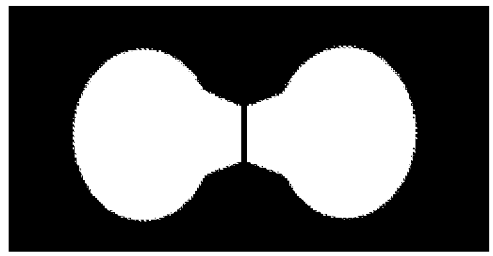

INTERFACE JOINT MATERIAL BASED ON INDUSTRIAL SOLID WASTE AND ITS PREPARATION

FIELD OF THE DISCLOSURE

The disclosure relates to the field of an interface joint material for construction, and in particular to an interface joint material based on industrial solid waste and a method for preparing the interface joint material based on industrial solid waste.

BACKGROUND OF THE DISCLOSURE

For concrete structures constructed in the marine environment, the formwork uses the fiber-doped ultra-high performance concrete (UHPC) precast concrete panel, which is not removed after the construction is completed. Therefore, it is necessary to inject the engineering interface joint material between the concrete structure and the formwork in the construction process to make the concrete structure and the template be integrated together, thereby to increase the interface bonding and corrosion protection performance of the concrete structure and the formwork.

At present, commonly used building interface joint materials are classified according to their compositions, which can be divided into two categories: inorganic joint materials and organic joint materials. The inorganic joint materials are mainly cement-based joint materials, while the organic joint materials are mainly acrylic joint materials. The cement-based joint materials have simple preparation process and wide sources of materials, but they are susceptible to drying shrinkage and cracking in the later period, and cannot play the purpose of long-term filling and reinforcement. The acrylate joint materials are safer and more environmentally friendly than the early acrylamide chemical joint materials, and do not have the defects of large drying shrinkage of the cement-based jointing materials in the later period, but the acrylate joint materials have lower strength and are easily oxidized and brittle.

For the concrete structures constructed in the marine environment, the joint materials used for injection between the concrete structure and the formwork, whether the cement-based joint materials or the acrylate joint materials, are not applicable. On the one hand, the formwork's surface is very smooth, and the joint materials are not easy to bond the surface. On the other hand, because the concrete structures and the formwork are different in composition, it is difficult for the joint materials to bond two materials with different components at the same time.

Therefore, it is necessary to develop an early-strength interface joint material that is suitable for two different concrete interfaces.

SUMMARY OF THE DISCLOSURE

In order to solve the problems existing in the related art, the disclosure provides an interface joint material based on industrial solid waste and its preparation method, which has good bonding to the concrete interfaces of different components and can be applied for the grouting between the concrete structure and the formwork in marine environment construction engineering.

To achieve the above purpose, the disclosure provides the following technical solutions.

In one of the technical solutions of the disclosure, the interface joint material based on the industrial solid waste includes raw materials in parts by weight as follows:
portland slag cement, 80~130 parts,
metakaolin, 80~130 parts,
the industrial solid waste, 80~130 parts,
sodium silicate, 25~35 parts,
alkali, 8~12 parts,
acrylate, 30~36 parts,
a trivinyl ether compound, 1~3 parts,
inorganic sulfite, 1~3 parts,
persulfate, 1~3 parts,
a water reducing agent, 3~6 parts, and
water, 60~80 parts.

The industrial solid waste is a mixture with a mass ratio of slag:bira nest:fly ash being 30:30:40.

The alkali acts not only to stimulate the formation of geopolymers from the inorganic materials such as the metakaolin and the industrial solid waste, but also to promote the hardening of the interfacial joint material.

In an embodiment, the interface joint material includes the raw materials in parts by weight as follows:
the portland slag cement, 100 parts,
the metakaolin, 100 parts,
the industrial solid waste, 100 parts,
the sodium silicate, 30 parts,
the alkali, 10 parts,
the acrylate, 30 parts,
the trivinyl ether compound, 3 parts,
the inorganic sulfite, 3 parts,
the persulfate, 3 parts,
the water reducing agent, 5 parts, and
the water, 70 parts.

In an embodiment, a model number of the portland slag cement is P·S·A 32.5; and the fly ash is grade I fly ash.

In an embodiment, the alkali is one of sodium hydroxide and potassium hydroxide; and the acrylate is a mixture of magnesium acrylate and calcium acrylate with a mass ratio of 5:1.

In an embodiment, the trivinyl ether compound is one of trivinyl cyanate and trihydroxypropane trivinyl ether.

In an embodiment, the inorganic sulfite is one of sodium sulfite and potassium sulfite.

In an embodiment, the persulfate is one of potassium persulfate and sodium persulfate.

In an embodiment, the water reducing agent is one of an amino sulfonate water reducing agent and a polycarboxylic acid water reducing agent.

In another technical solution of the disclosure, a method for preparing the interface joint material based on the industrial solid waste includes the following steps:
step 1, weighing the portland slag cement, the metakaolin, the industrial solid waste, the water reducing agent, the acrylate, the trivinyl ether compound and the inorganic sulfite in the parts by weight, and mixing evenly to obtain a mixture A;
step 2, weighing the sodium silicate, the alkali and one-half of the water by weight to obtain a mixture B, and immediately adding the mixture B to the mixture A to obtain a mixture C;
step 3, weighing the persulfate and the remaining water to obtain a mixture D and adding the mixture D into the mixture C, and mixing evenly to obtain the interface joint material based on the industrial solid waste.

The mixture B of the sodium silicate, the alkali and one-half of the water in the step 2 is added to the mixture A immediately; and if the mixture B is added to the mixture A after cooling, the strength of the prepared interface joint material will be reduced.

First, the mixture B is added to the mixture A, which can excite the inorganic components in the mixture to form geopolymer, and then the mixture D is added to the mixture C, which can catalyze the cross-linking reaction of the organic components in the mixture to form a three-dimensional network structure. At this time, the geopolymer and cement components are evenly dispersed in the organics to form the three-dimensional network structure, the geopolymer, the cement components and the organics are closely combined, and the interface joint material with high ductility is formed.

The interface joint material prepared by the disclosure has many polar groups due to its organic component-water-soluble acrylate, which can form a large number of hydrogen bonds and intermolecular forces with $Ca^{2+}$, $Si^{4+}$, etc. in silicate concrete to produce physical adsorption, and can also make complexation reaction with $Ca^{2+}$, $Al^{3+}$ ions on the concrete surface to form chemical adsorption. At the same time, the cross-linked structure formed by the acrylate has characteristics of water absorption and swelling, which can endow the interface joint material with the characteristics of micro-expansion; as an inorganic gelling material, cement can work together with organic materials to enhance the adhesion of the interface joint material to the different concrete interfaces; the geopolymer interpenetrated in a three-dimensional network structure of organic materials can overcome the defect of low strength of organic joint materials, enhance the strength of the interface joint material, promote the solidification of the interface joint material and solidify the metal ions, endow the interface joint material with fast hardening and early strength performance, and at the same time, it is more environmentally friendly and safe.

The disclosure discloses the following technical effects:
the interface joint material based on industrial solid waste is suitable for a concrete interface of different components, with good bonding, high strength, and the advantages of pumping, fast hard, early strength, micro expansion and high ductility; at the same time, the disclosure adds slag, bira nest and fly ash (industrial solid waste) to the interface joint material based on the industrial solid waste, which improves a utilization rate of the industrial solid waste in the construction joint materials, and is of great significance for the recycling of the industrial solid waste.

BRIEF DESCRIPTION OF THE DRAWINGS

Figure illustrates an 8-shaped mold for testing the bond strength of the disclosure.

DETAILED DESCRIPTION OF EMBODIMENTS

A variety of exemplary embodiments of the disclosure are described in detail. Detailed description should not be considered as the limitation of the disclosure, but should be understood as more detailed description of some aspects, features and embodiments of the disclosure.

It should be understood that terms described in the disclosure are only for describing special embodiments and are not intended to limit the disclosure. In addition, for a numerical range in the disclosure, it should be understood that intermediate values between upper and lower limits of the range are also specifically disclosed. Smaller ranges between any stated values or intermediate values within the range and any other stated values or intermediate values within the stated range is also included in the disclosure. The upper and lower limits of the smaller ranges can be included or excluded independently.

Unless otherwise stated, all technical and scientific terms used herein have the same meaning as those commonly understood by those skilled in the art described in the disclosure. Although the disclosure only describes preferred methods and materials, any methods and materials similar or equivalent to the former methods and materials herein can also be used in embodiments or tests of the disclosure. All literature referred to in a specification is incorporated by reference for the purpose of disclosing and describing the methods and/or materials associated with the literature. In case of conflict with any incorporated literature, the contents of the specification shall prevail.

Without departing from the scope or spirit of the disclosure, it is obvious to those skilled in the art that various improvements and changes can be made to specific embodiments of the specification of the disclosure. Other embodiments obtained from the specification of the disclosure will be apparent to those skilled in the art. The specification and the embodiments of the disclosure are only illustrative.

Terms "involving", "including", "having", "containing" and so on used in the specification are open terms, which mean including but not limited to.

Unless otherwise specified, "parts" in the disclosure are calculated as parts by weigh.

Unless otherwise specified, the raw materials used in the embodiments of the disclosure can be obtained through purchase.

The industrial solid waste used in the embodiments of the disclosure is a mixture with a mass ratio of slag:bira nest:fly ash being 30:30:40. Among them, the fly ash is grade I fly ash; a specific surface area of the slag is more than 700 m$^2$/kg; and the bira nest is discharged from the thermal power plant, which is collected at the bottom of a boiler combustion chamber and mainly contains silicon oxide, aluminum oxide and iron oxide.

A model number of the portland slag cement used in the embodiments of the disclosure is P·S·A 32.5.

A bending strength test method of the disclosure: the interface joint material is mechanically molded into a three-point flexural test piece in a 40 mm×40 mm×160 mm triplex test mold, and after 1 day (d), the mold is removed and the test piece is moved into a standard curing box for curing.

A compressive strength test method of the disclosure: the interface joint material is mechanically molded into a compressive strength test piece in a 70.7 mm×70.7 mm×70.7 mm cube mold, and after 1 d, the mold is removed and the test piece is moved into a standard curing box for curing.

A bond strength test method of the disclosure: according to "Standard for Test Methods of Basic Performance of Building Mortar", the bond strength is measured with 8-shaped molds. Test mold: the 8-shaped mold whose size is 78 mm×22.5 mm×22.5 mm with a bottom is provided, three test pieces for each group are made. Making test pieces: the UHPC concrete or C40 impermeable concrete made of raw materials including the cement, silica fume, industrial solid waste, sands, a water-reducing agent, stones, steel fiber, etc. is poured into the 8-shaped mold with intermediate spacer and the 8-shaped mold is placed in a standard curing box for curing 28 d, and then one-half of the test piece in the 8-shaped mold is taken out to put into a 8-shaped mold, and the prepared cement mortar material is poured on the other side of the 8-shaped mold, stirring with a mixer, and vibrating with a vibration platform; and then test molds with test blocks stand for 1 h and are put into the standard curing box for curing. After 1 d of the curing, the molds are removed and then the test blocks are numbered and put into the standard curing box for curing 28 d. The basic characteristics of the standard curing box are temperature (18~22) ° C. and relative humidity above 95%. Three strength values are measured for each group of test blocks, if the strength values of the three test blocks have maximum, minimum and intermediate values, respectively, the maximum and minimum values are used to make differences from the intermediate value, if the ratio of only one difference to the intermediate value is greater than 15%, the intermediate value shall be taken as the cube bending strength value of the test block; if the ratio of each difference to the intermediate value is greater than 15%, the set of test data is invalid, and the test block measurement is performed again; and if the ratio of each difference to the intermediate value is less than 15%, the average value of the three test block data is taken as the cube bending strength value (accurate to 0.1 MPa) of the group of test blocks. The bond strength between the interface joint material and UHPC concrete is recorded as bond strength 1. The bond strength between the interface joint material and C40 impermeable concrete is recorded as bond strength 2.

Embodiment 1

The raw materials are accurately weighed in parts by weight:
the portland slag cement, 100 parts,
the metakaolin, 100 parts,
the industrial solid waste, 100 parts,
the sodium silicate, 30 parts,
the sodium hydroxide, 10 parts,
the magnesium acrylate, 25 parts,
the calcium acrylate, 5 parts,
the trivinyl cyanate, 3 parts,
the sodium sulfite, 3 parts,
the sodium persulfate, 3 parts,
the polycarboxylic acid water reducing agent, 5 parts, and
the water, 70 parts.
The preparation method includes the following steps:
step 1, weighing the portland slag cement of 100 parts, the metakaolin of 100 parts, the industrial solid waste of 100 parts, the polycarboxylic acid water reducing agent of 5 parts, the magnesium acrylate of 25 parts, the calcium acrylate of 5 parts, the trivinyl cyanate of 3 parts and the sodium sulfite of 3 parts, and mixing evenly to obtain a mixture A;
step 2, weighing the sodium silicate of 30 parts, the sodium hydroxide of 10 parts and the water of 35 parts to obtain a mixture B, and immediately adding the mixture B to the mixture A to obtain a mixture C; and
step 3, weighing the sodium persulfate of 3 parts and the remaining water of 35 parts to get a mixture D and adding the mixture D into the mixture C, and mixing evenly to obtain the interface joint material based on the industrial solid waste.

Embodiment 2

The raw materials are accurately weighed in parts by weight:
the portland slag cement, 80 parts,
the metakaolin, 130 parts,
the industrial solid waste, 130 parts,
the sodium silicate, 35 parts,
the sodium hydroxide, 12 parts,
the magnesium acrylate, 30 parts,
the calcium acrylate, 6 parts,
the trivinyl cyanate, 2 parts,
the sodium sulfite, 2 parts,
the sodium persulfate, 2 parts,
the polycarboxylic acid water reducing agent, 6 parts, and
the water, 80 parts.
The preparation method includes the following steps:
step 1, weighing the portland slag cement of 80 parts, the metakaolin of 130 parts, the industrial solid waste of 130 parts, the polycarboxylic acid water reducing agent of 2 parts, the magnesium acrylate of 30 parts, the calcium acrylate of 6 parts, the trivinyl cyanate of 2 parts and the sodium sulfite of 2 parts, and mixing evenly to obtain a mixture A;
step 2, weighing the sodium silicate of 35 parts, the sodium hydroxide of 12 parts and the water of 40 parts to obtain a mixture B, and immediately adding the mixture B to the mixture A to obtain a mixture C; and
step 3, weighing the sodium persulfate of 3 parts and the remaining water of 35 parts to obtain a mixture D and adding the mixture D into the mixture C, and mixing evenly to obtain the interface joint material based on the industrial solid waste.

Embodiment 3

The raw materials are accurately weighed in parts by weight:
the portland slag cement, 130 parts,
the metakaolin, 80 parts,
the industrial solid waste, 80 parts,
the sodium silicate, 25 parts,
the potassium hydroxide, 8 parts,
the magnesium acrylate, 25 parts,
the calcium acrylate, 5 parts,
the trihydroxypropane trivinyl ether, 1 part,
the potassium sulfite, 1 part,
the potassium persulfate, 1 part,
the amino sulfonate water reducing agent, 3 parts, and
the water, 60 parts.
The preparation method includes the following steps:
step 1, weighing the portland slag cement of 130 parts, the metakaolin of 80 parts, the industrial solid waste of 80 parts, the amino sulfonate water reducing agent of 3 parts, the magnesium acrylate of 25 parts, the calcium acrylate of 5 parts, the trihydroxypropane trivinyl ether of 1 part and the potassium sulfite of 1 part, and mixing evenly to obtain a mixture A;
step 2, weighing the sodium silicate of 25 parts, the potassium hydroxide of 8 parts and the water of 30 parts to obtain a mixture B, and immediately adding the mixture B to the mixture A to obtain a mixture C; and
step 3, weighing the potassium persulfate of 1 part and the remaining water of 30 parts to obtain a mixture D and adding the mixture D into the mixture C, and mixing evenly to obtain the interface joint material based on the industrial solid waste.

Comparative Example 1

The comparative example 1 is basically the same as the Embodiment 1, except that the addition of the sodium silicate and the sodium hydroxide is omitted.

Comparative Example 2

The comparative example 2 is basically the same as the Embodiment 1, except that the addition of the magnesium acrylate and the calcium acrylate is omitted.

The interface joint materials based on the industrial solid waste obtained by the embodiments 1-3 and comparative examples 1-2 have been tested for the bending strength, the compressive strength, and the bond strength, and the results are shown in Table 1.

TABLE 1

|  | 1 d bending strength (MPa) | 3 d bending strength (MPa) | 28 d bending strength (MPa) | 1 d compressive strength (MPa) | 3 d compressive strength (MPa) | 28 d compressive strength (MPa) | bond strength 1 (kg/m$^2$) | bond strength 2 (kg/m$^2$) |
| --- | --- | --- | --- | --- | --- | --- | --- | --- |
| Embodiment 1 | 8.0 | 16.0 | 20.0 | 22.0 | 48.0 | 61.0 | 40.6 | 42.4 |
| Embodiment 2 | 9.0 | 17.0 | 21.0 | 21.0 | 42.0 | 58.0 | 38.4 | 38.9 |
| Embodiment 3 | 8.0 | 16.0 | 18.0 | 21.0 | 41.0 | 56.0 | 37.2 | 38.1 |
| Comparative example 1 | 6.0 | 11.0 | 16.0 | 12.0 | 17.0 | 40.0 | 39.1 | 39.5 |
| Comparative example 2 | 4.0 | 8.0 | 13.0 | 22.0 | 36.0 | 53.0 | 30.0 | 30.3 |

As can be seen from Table 1, omitting the addition of the sodium silicate and the sodium hydroxide has a greater effect on the strength of the prepared interface joint material based on the industrial solid waste and a smaller effect on the bond strength, indicating that the sodium silicate and the sodium hydroxide as the alkali agonists successfully excited the inorganic materials to form the geopolymers. The omission of the addition of the magnesium acrylate and the calcium acrylate has less effect on the strength of the prepared interfacial joint materials based on the industrial solid waste and more on the bond strength, indicating that the organic materials are able to enhance the bonding properties of the joint materials, which is consistent with the physical and chemical adsorption of organic materials as previously described. Moreover, Table 1 also shows that the interface joint material based on the industrial solid waste prepared by the present disclosure has a high bond strength to the surface of the precast concrete panel with smooth surface and the surface of the C40 impermeable concrete structure with smooth surface, which indicates that the interface joint material based on the industrial solid waste prepared by the present disclosure can bond well to the concrete members of the two different compositions.

The embodiments described above are only a description of the preferred way of the disclosure, are not intended to limit the scope of the disclosure. Without departing from the spirit of the disclosure, all kinds of deformations and improvements made to the technical solutions of the disclosure by those skilled in the art shall fall within a scope of protection determined by the claims of the disclosure.

What is claimed is:

1. An interface joint material based on industrial solid waste, comprising raw materials in parts by weight as follows:
    portland slag cement, 80~130 parts,
    metakaolin, 80~130 parts,
    the industrial solid waste, 80~130 parts,
    sodium silicate, 25~35 parts,
    alkali, 8~12 parts,
    acrylate, 30~36 parts,
    a trivinyl ether compound, 1~3 parts,
    inorganic sulfite, 1~3 parts,
    persulfate, 1~3 parts,
    a water reducing agent, 3~6 parts, and
    water, 60~80 parts;
    wherein the industrial solid waste is a mixture with a mass ratio of slag:a thermal power plant discharged material: fly ash being 30:30:40, and the thermal power plant discharged material contains silicon oxide, aluminum oxide and iron oxide;
    wherein the alkali is one of sodium hydroxide and potassium hydroxide; and the acrylate is a mixture of magnesium acrylate and calcium acrylate with a mass ratio of 5:1;
    wherein the trivinyl ether compound is one of trivinyl cyanate and trihydroxypropane trivinyl ether;
    wherein the inorganic sulfite is one of sodium sulfite and potassium sulfite;
    wherein the persulfate is one of potassium persulfate and sodium persulfate; and
    wherein a method for preparing the interface joint material comprises following steps:
    step 1, weighing the portland slag cement, the metakaolin, the industrial solid waste, the water reducing agent, the acrylate, the trivinyl ether compound and the inorganic sulfite in the parts by weight, and mixing evenly to obtain a mixture A;
    step 2, weighing the sodium silicate, the alkali and one-half of the water in the parts by weight to obtain a mixture B, and adding the mixture B to the mixture A to obtain a mixture C; and
    step 3, weighing the persulfate and the remaining water to obtain a mixture D and adding the mixture D into the mixture C, and mixing evenly to obtain the interface joint material based on the industrial solid waste.

2. The interface joint material based on the industrial solid waste according to claim 1, wherein the interface joint material comprises the raw materials in parts by weight as follows:
    the portland slag cement, 100 parts,
    the metakaolin, 100 parts,
    the industrial solid waste, 100 parts,
    the sodium silicate, 30 parts,
    the alkali, 10 parts,
    the acrylate, 30 parts,
    the trivinyl ether compound, 3 parts,
    the inorganic sulfite, 3 parts,
    the persulfate, 3 parts,
    the water reducing agent, 5 parts, and
    the water, 70 parts.

3. The interface joint material based on the industrial solid waste according to claim 1, wherein a model number of the portland slag cement is P·S·A 32.5; and the fly ash is grade I fly ash.

4. The interface joint material based on the industrial solid waste according to claim 1, wherein the water reducing agent is one of an amino sulfonate water reducing agent and a polycarboxylic acid water reducing agent.

\* \* \* \* \*